(12) United States Patent
Credle, Jr. et al.

(10) Patent No.: US 6,540,100 B2
(45) Date of Patent: Apr. 1, 2003

(54) METHOD AND APPARATUS FOR REMOTE SALES OF VENDED PRODUCTS

(75) Inventors: William S. Credle, Jr., Roswell, GA (US); John P. Giles, Atlanta, GA (US); James Michael Watson, Fairburn, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/800,349

(22) Filed: Mar. 6, 2001

(65) Prior Publication Data

US 2002/0125263 A1 Sep. 12, 2002

(51) Int. Cl.⁷ .................................................. G07F 11/00
(52) U.S. Cl. .......................................... 221/2; 221/119
(58) Field of Search .............................. 221/2, 119, 120, 221/121, 122, 130, 133, 129, 24, 185, 199, 192, 79, 81, 88

(56) References Cited

U.S. PATENT DOCUMENTS

| | | | | |
|---|---|---|---|---|
| 2,222,862 A | * | 11/1940 | Tratsch | 221/81 |
| 2,299,583 A | * | 10/1942 | Loewy et al. | 221/185 |
| 2,852,159 A | * | 9/1958 | Klein | 221/185 |
| 3,092,235 A | | 6/1963 | Kemp | 194/10 |
| 3,653,538 A | * | 4/1972 | Lamar | 221/185 |
| 4,311,211 A | | 1/1982 | Benjamin et al. | 186/53 |
| 4,519,522 A | * | 5/1985 | McElwee | 221/79 |
| 4,719,725 A | | 1/1988 | Weiner | 52/31 |
| 4,811,764 A | * | 3/1989 | McLaughlin | 221/2 |
| 4,812,629 A | | 3/1989 | O'Neil et al. | 235/383 |
| 4,844,493 A | | 7/1989 | Kramer | 180/169 |
| 4,899,666 A | | 2/1990 | Meier | 104/88 |
| 5,215,213 A | | 6/1993 | Nestler et al. | 221/129 |
| 5,222,855 A | | 6/1993 | Bernard, II et al. | 414/331 |
| 5,608,643 A | | 3/1997 | Wichter et al. | 364/479.14 |
| 5,782,377 A | * | 7/1998 | Fassman | 221/185 |
| 5,816,443 A | | 10/1998 | Bustos | 221/211 |

FOREIGN PATENT DOCUMENTS

| | | | | |
|---|---|---|---|---|
| DE | 444151 | * | 10/1925 | 221/81 |
| EP | 000562198 A1 | * | 9/1993 | 221/121 |
| FR | 910618 | * | 6/1946 | 221/79 |
| JP | 11 134542 | | 5/1999 | |
| JP | 11 250322 | | 9/1999 | |
| WO | WO 00 37342 | | 6/2000 | |

* cited by examiner

Primary Examiner—Kenneth W. Noland
(74) Attorney, Agent, or Firm—Sutherland Asbill & Brennan LLP

(57) ABSTRACT

A mobile vending machine for transporting and vending a number of products. The mobile vending machine includes a storage compartment for storing the products, a dispensing mechanism for dispensing the products, and a drive mechanism. The storage compartment is positioned about the drive mechanism for movement therewith.

32 Claims, 13 Drawing Sheets

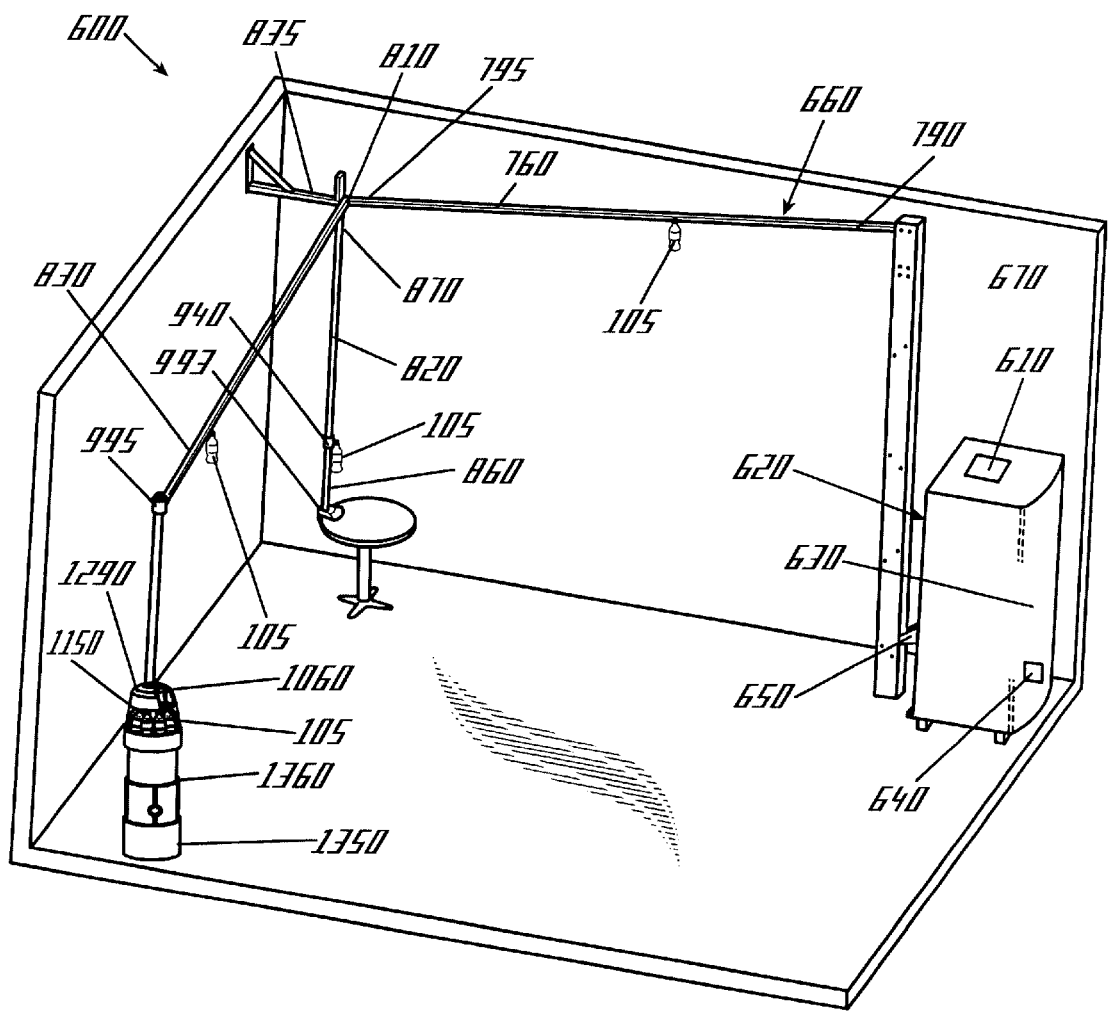
Fig. 9
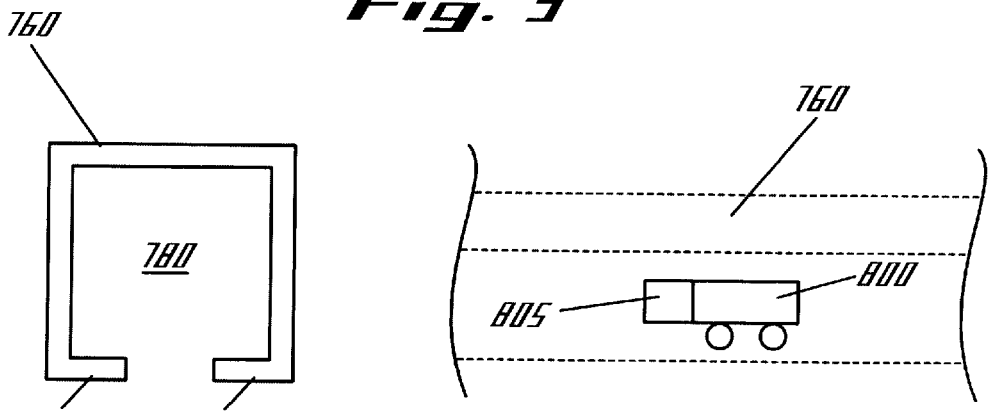
Fig. 11
Fig. 12

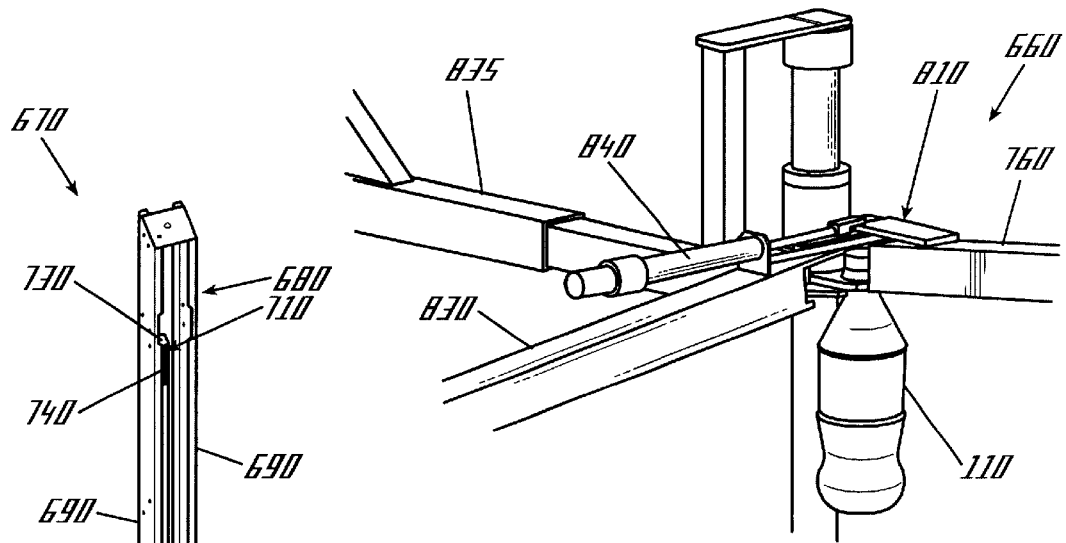
Fig. 10
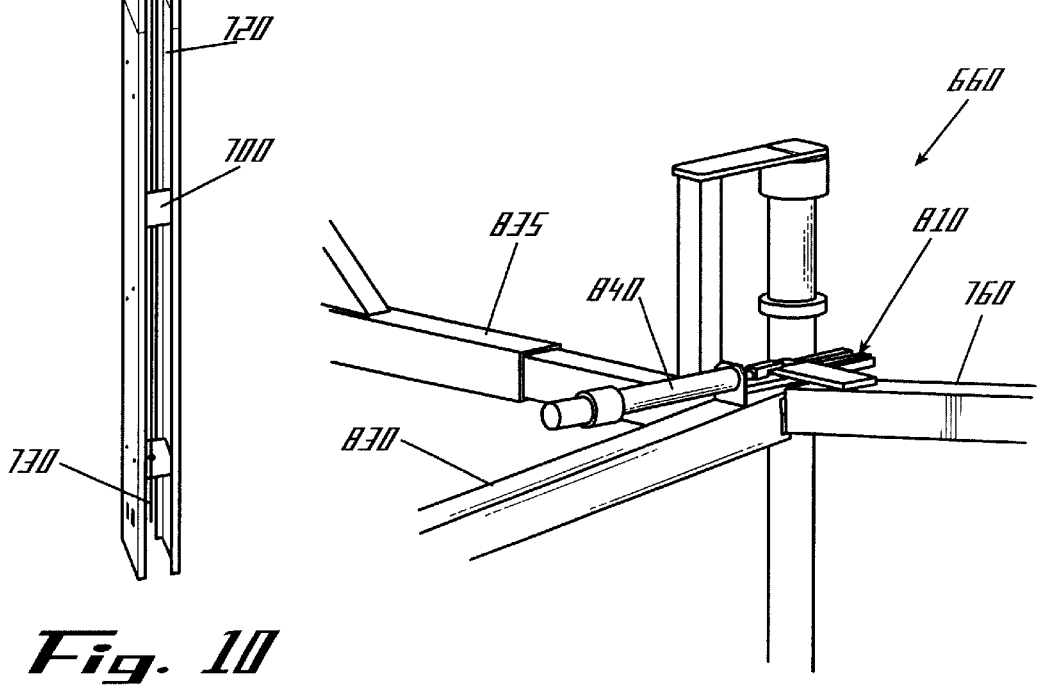
Fig. 13
Fig. 14

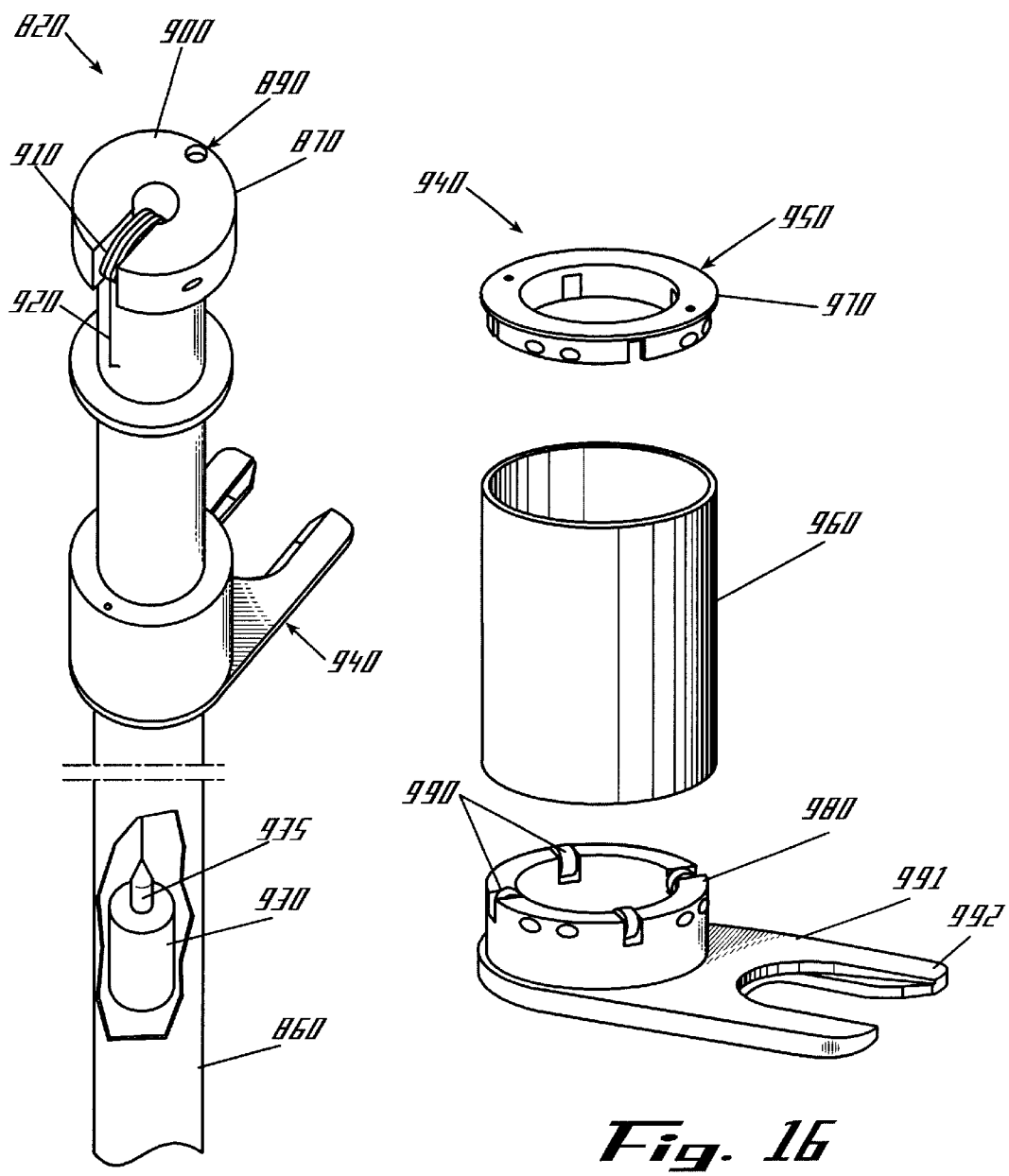

METHOD AND APPARATUS FOR REMOTE SALES OF VENDED PRODUCTS

TECHNICAL FIELD

The present invention relates generally to several methods and apparatus for delivering products to consumers and more particularly relates to several methods and apparatus to deliver vended products to consumers via remote and mobile techniques.

BACKGROUND OF THE INVENTION

The use of vending machines and other types of product dispensers is well known in the art. Product sales volume from such product dispensers often depends in part on placing the dispenser in a location with sufficient consumer traffic. Because the use of the product dispenser is often an impulse purchase, the dispenser preferably should be located wherever a sufficient number of consumers may gather or pass by.

One drawback with the use of many current product dispensers is that the dispensers may not always be placed where the consumers may be gathered. There are many locations where product dispensers simply are not available. This lack of availability may be due to the size of the dispenser, the expense of the dispenser, the availability of electrical power, or even aesthetic reasons. Further, moving the dispensers on a temporary basis is often difficult, expensive, and/or time consuming.

In addition to the location of the dispensers, the appearance and operation of the dispensers should be designed to catch the consumer's eye and ensure that the consumer has a pleasant purchasing experience. Even if the dispensers can be located in a high traffic area, the purchasing experience is rarely considered to be "fun" because of the ubiquity of the dispensers. As such, the product dispensers are considered simply a means to provide the products therein to the consumer as opposed to an attraction in and of itself.

What is needed, therefore, are methods and apparatus that ensure that the product dispensers easily may be located wherever the consumers are gathered. Further, there is need for product dispensers that create impulse purchases by being unique, entertaining, and/or interesting. These goals must be accomplished with methods and apparatus that are convenient, safe, and reasonably priced.

SUMMARY OF THE INVENTION

The present invention thus provides a mobile vending machine for transporting and vending a number of products. The mobile vending machine includes a storage compartment for storing the products, a dispensing mechanism for dispensing the products, and a drive mechanism. The storage compartment is positioned about the drive mechanism for movement therewith.

Specific embodiments of the mobile vendor include the storage compartment having a number of storage rows. Each of the storage rows may include a wall and a floor. The floor may include an elevator port for use with the dispensing mechanism. The elevator port may include a number of apertures surrounding a support flange. Each of the storage rows may include a collar for rotation within the wall and the floor. The collar may include a number of partitions therein and the partitions may form a number of product compartments. A collar motor may rotate the collar.

The dispensing mechanism may include an access port for dispensing one of the products at a time. The dispensing mechanism also may include an elevator so as to transport one of the products from the storage compartment to the access port. The elevator may include a pair of elevator arms. The pair of elevator arms may be positioned so as to pass through the apertures of the elevator port.

The drive mechanism may include a number of wheels. A drive motor may power the wheels. The drive mechanism may include a battery.

The mobile vendor also may include an internal control device for controlling the storage compartment, the dispensing mechanism, and the drive mechanism. A remote control device may be in communication with the internal control device. The remote control device may control the drive mechanism, the storage compartment, and the dispensing mechanism. The mobile vendor further may include a first speaker and a first microphone while the remote control device may include a second speaker and a second microphone in communication with one another. The storage compartment may include an outer shell with advertising indicia thereon.

A further embodiment of the present invention may provide for a remote vending system for vending a number of products. The remote vending system may include a product storage compartment, a product delivery mechanism, and a product drop mechanism, all positioned along a predetermined path. The remote vending systems may further include a control device so as to instruct the product storage device to deliver one of the products to the product delivery mechanism and to instruct the product delivery mechanism to deliver the product to the product drop mechanism.

The product storage compartment may include a vending machine. The product delivery mechanism may include a vertical conveyor positioned adjacent to the product storage compartment. The vertical conveyor may include a platform for transporting one of the products. The vertical conveyor may include a pulley system for driving the platform. The product delivery mechanism also may include a horizontal conveyor. The horizontal conveyor may include a first end and a second end such that the first end is positioned adjacent to the vertical conveyor and the second end is positioned adjacent to the product drop mechanism. The horizontal conveyor may include an inclined position, such that the first end of the horizontal conveyor is higher than the second end so that the products can slide from the first end to the second end. The inclined position may be about five (5) to ten (10) degrees. The horizontal conveyor also may include a transport device positioned therein so as to transport one of the products from the first end to the second end.

The product delivery mechanism may include a further horizontal conveyor positioned adjacent to the second end of the horizontal conveyor. The product delivery mechanism also may include a directional switch. The directional switch may be positioned adjacent to the second end of the horizontal conveyor, the further horizontal conveyor, and the product drop mechanism so as to direct one of the products from the horizontal conveyor to the further horizontal conveyor or to the product drop mechanism under the control of the control device. The directional switch may include a piston so as to push the horizontal conveyor in the direction of either the further horizontal conveyor or the product drop mechanism.

The product drop mechanism may include an elongated member with a first end and a second end and with the first end positioned adjacent to the product delivery mechanism. The product drop mechanism may include a pulley system associated with the elongated member so as to deliver one of the products from the first end to the second end. The product drop mechanism may include a product holder connected to the pulley system. The product holder may include a fixed fork assembly or a rotating fork assembly.

The rotating fork assembly may include a pair of forks positioned on an assembly base for rotation thereon. The pair of forks may include a spring so as to bias the pair of forks in the closed position. The forks are capable of supporting one of the products in the closed position and of releasing the product in the open position. The product drop mechanism may include a flipper mechanism positioned adjacent to the second end of the elongated member. The flipper mechanism may include a flipper. The flipper may be driven by a solenoid and the solenoid may be activated by a switch. The switch is positioned about the second end of the elongated member such that the product holder contacts the switch when the product holder descends the elongated member. The flipper is positioned about the second end of the elongated member such that the flipper contacts and causes the rotating fork assembly to rotate when the product holder descends the elongated member and the switch is activated.

The product drop mechanism may include a product dispenser positioned adjacent to the second end of the elongated member. The product dispenser may include a product platter positioned for rotation therein. The product platter also may include a number of product basins so as to support the products therein. The product platter may include a number of position switches in communication with the control system so as to determine whether one of the products is positioned in each of the product basins. The product dispenser may include a platter. The product dispenser may include a vending cone positioned on top of the product platter. The vending cone may include a transparent material. The vending cone may include a loading aperture such that the one of the products may be delivered through the loading aperture from the product drop mechanism to one of the product basins on the product platter.

A further embodiment of the present invention provides for a dispensing system for dispensing a number of products from a vending machine. The dispensing system may include an elevator and a storage row. The storage row may include a wall and a floor. The storage row also may include an elevator port for use with the elevator. The storage row further may include a collar for rotation within the wall and the floor. The collar may include a number of partitions therein. The partitions may form a number of product compartments for rotating the products along the floor to the elevator port for transport by the elevator.

The dispensing system may include a number of the storage rows. The elevator port may include a number of apertures and a product support flange. The elevator may include a pair of elevator arms. The elevator arms may be positioned to pass through the apertures of the elevator port and to pick up one of the products.

A product dispenser may be positioned adjacent to the storage row and in communication with the elevator. The product dispenser may include a product platter positioned for rotation therein. The product platter may include a number of apertures positioned therein. The apertures may each include a product support rotatably positioned therein. The product support may be sized to allow the elevator arms to pass through each aperture and to support one of the products. The product support may include a hinge attached to the product platter such that the product support will rotate upward when the elevator lifts one of the products through the aperture and then rotate downward after the product passes therethrough. The product dispenser may include a platter. The product dispenser may include a vending cone positioned on top of the product platter. The vending cone may include a transparent material. The dispensing system further may include an outer shell positioned around the storage row with one or more storage racks positioned thereon.

The method of the present invention provides for the delivery of a vended product. The method may include the steps of removing a first product from a product vending machine, sensing that the first product has been removed from the vending machine, activating a product storage facility to release a second product, elevating the second product along a first predetermined vertical path, transporting the second product along a predetermined substantially horizontal path, and lowering the second product along a second predetermined vertical path into the product vending machine.

Other objects, features, and advantages of the present invention will become apparent upon review of the following detailed description of the preferred embodiments of the invention when taken in conjunction with the drawings and the appended claims.

BRIEF DESCRIPTION OF THE DRAWINGS

FIG. 9 is a perspective view of the remote vending system of the present invention.

FIG. 10 is a perspective view of the vertical conveyor of the remote vending system of FIG. 9.

FIG. 11 is a cross-sectional view of the horizontal conveyor of the remote vending system of FIG. 9.

FIG. 12 is a side plan view of a transport device with the horizontal conveyor shown in phantom lines.

FIG. 13 is a perspective view of the directional switch of the remote vending system of FIG. 9 with the switch aligning with the drop mechanism.

FIG. 14 is a perspective view of the directional switch of the remote vending system of FIG. 9 with the switch aligning with the further horizontal conveyor.

FIG. 15 is a perspective view of a drop mechanism of the remote vending system of FIG. 9.

FIG. 16 is an exploded view of the product holder of the drop mechanism of FIG. 15.

DETAILED DESCRIPTION OF THE INVENTION

Figure 1:
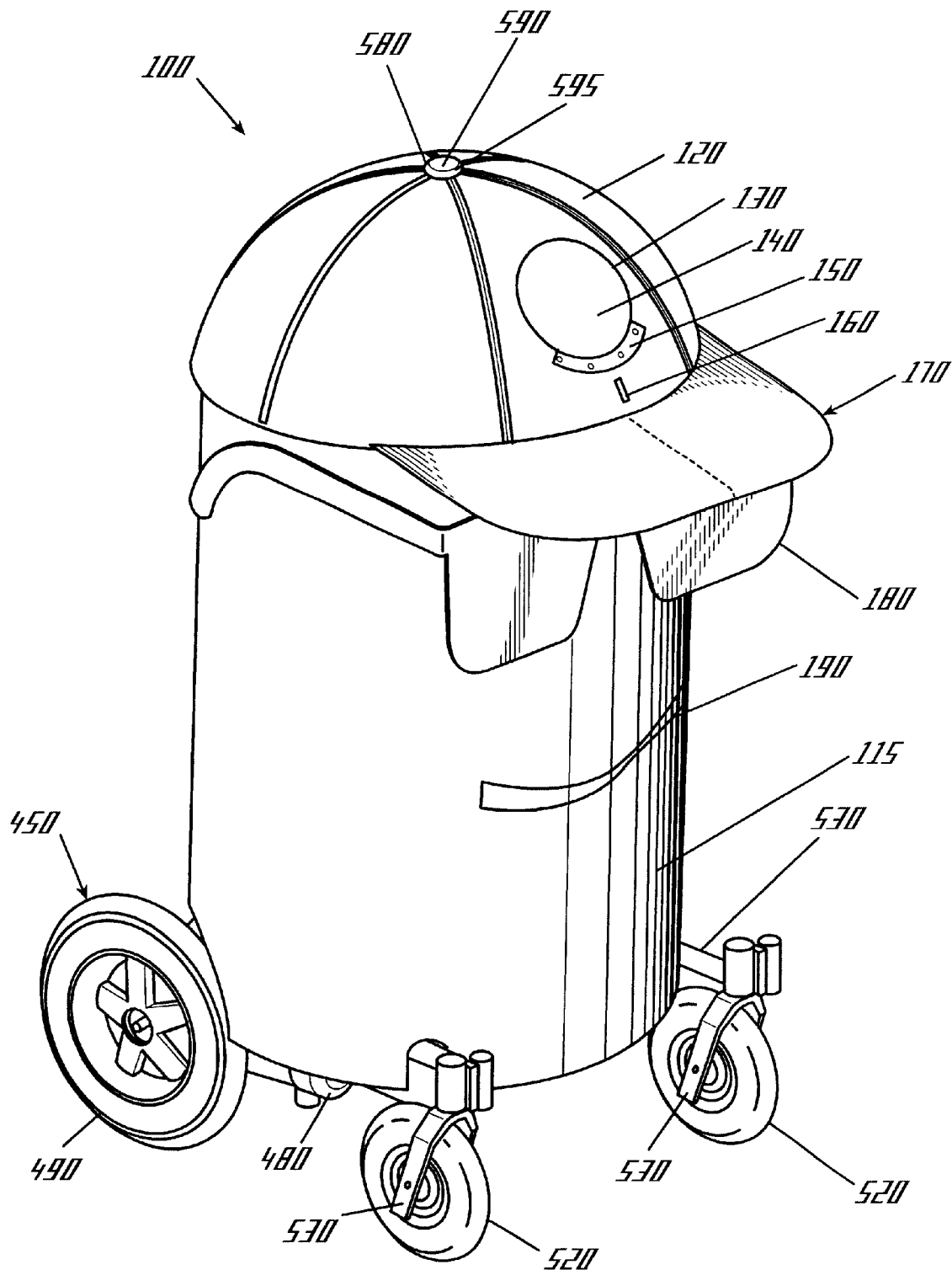
FIG. 1 is a perspective view of a mobile vendor of the present invention.
Figure 2:
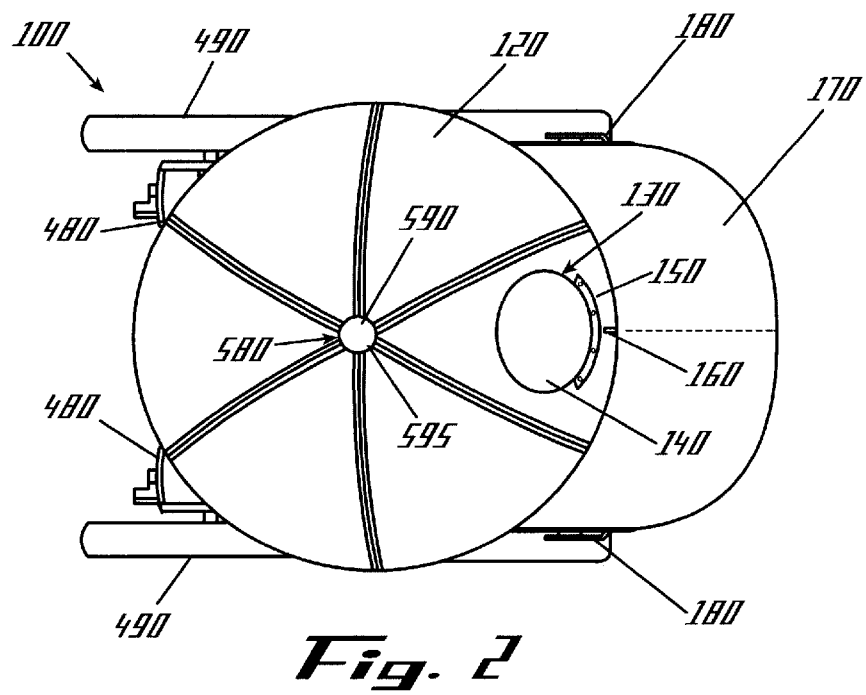
FIG. 2 is a top plan view of the mobile vendor of FIG. 1.

Referring now to the drawings in which like numerals indicate like parts throughout the several views, FIGS. 1–8 show a mobile vendor 100 of the present invention. The mobile vender 100 may store and vend a number of products 105. Each of the products 105 may be, for example, a beverage container 110. The product 105, however, may be any type of item that may be stored in a conventional product dispenser and vended therefrom.

The mobile vendor 100 may include an outer shell 115. The outer shell 115 may be a substantially hollow, cylindrical structure, but any convenient size or shape may be used. The outer shell 115 is preferably made from a lightweight, substantially rigid material such as steel, aluminum, or similar metals; thermoplastics such as polycarbonate or PETG polyethylene terephthalate-glycol); or similar materials. The outer shell 115 preferably is insulated with foam or similar materials.

An access lid 120 may enclose the outer shell 115. The access lid 120 may be attached to the outer shell 115 by hinges, springs, or other types of conventional joinder mechanisms. The access lid 120 may be removed or opened so as to permit access to the interior of the outer shell 115 so as to load the products 105 therein. The access lid 120 may be made from the same materials as the outer shell 115. Alternatively, the access lid 120 may be made out of a rigid foam or similar materials. The access lid 120 is preferably insulated.

The access lid 120 may have an access port 130 positioned therein. The access port 130 preferably is sized to permit the vending of one of the products 105 therethrough. As is shown, the access port 130 may have a vending lid 140 or a similar type of enclosing structure attached by hinges, springs, or other types of conventional joinder mechanisms. The vending lid 140 may be omitted if desired. Further, more than one access port 130 may be used. The access port 130 and the vending lid 140 allow the products 105 to be pushed out of the mobile vendor 100 at least one at time and/or allows the consumer to grasp one of the products 105. The access lid 120 of the mobile vendor 100 also may have a number of conventional selection panels 150 and a coin slot 160 positioned thereon. Alternatively, the selection panels 150 and the coin slot 160 may be positioned anywhere on the mobile vendor 100.

As is shown in FIG. 1, the mobile vendor 100 of the present invention also may include decorative aspects. For example, the access lid 120 is shown in the shape of a baseball cap 170. The outer shell 115 includes a pair of sunglasses 180 and one or more trademarks or logos 190 that may be associated with the products 105 positioned within the mobile vendor 100, with the location of the mobile vendor 100, or with third party advertising. In this case, the Dynamic Ribbon device of The Coca-Cola Company of Atlanta, Ga. is shown as a kind of "mouth" for the vender 100. Any type of aesthetic design, however, may be used to "personalize" the outer shell 115, the access lid 120, and the mobile vendor 100 as a whole. Further, the decorative aspects may include the use of color, lights, sound, and other types of accessories. The decoration shown herein is not intended to be limiting in any manner.

Figure 4:
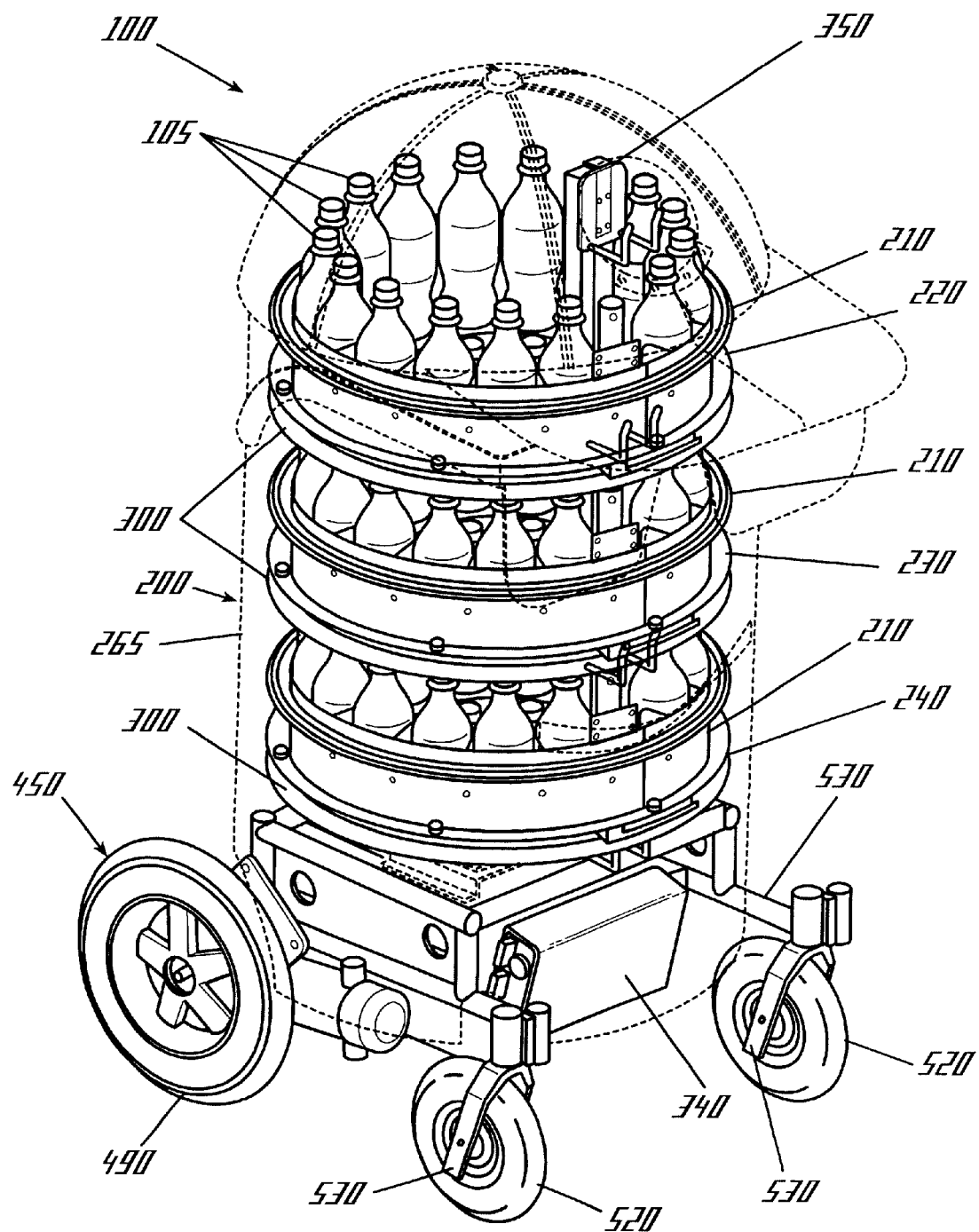
FIG. 4 is a perspective view of the storage and elevation system and the drive system of the mobile vendor of FIG. 1 with the outer shell shown in phantom lines.
Figure 5:
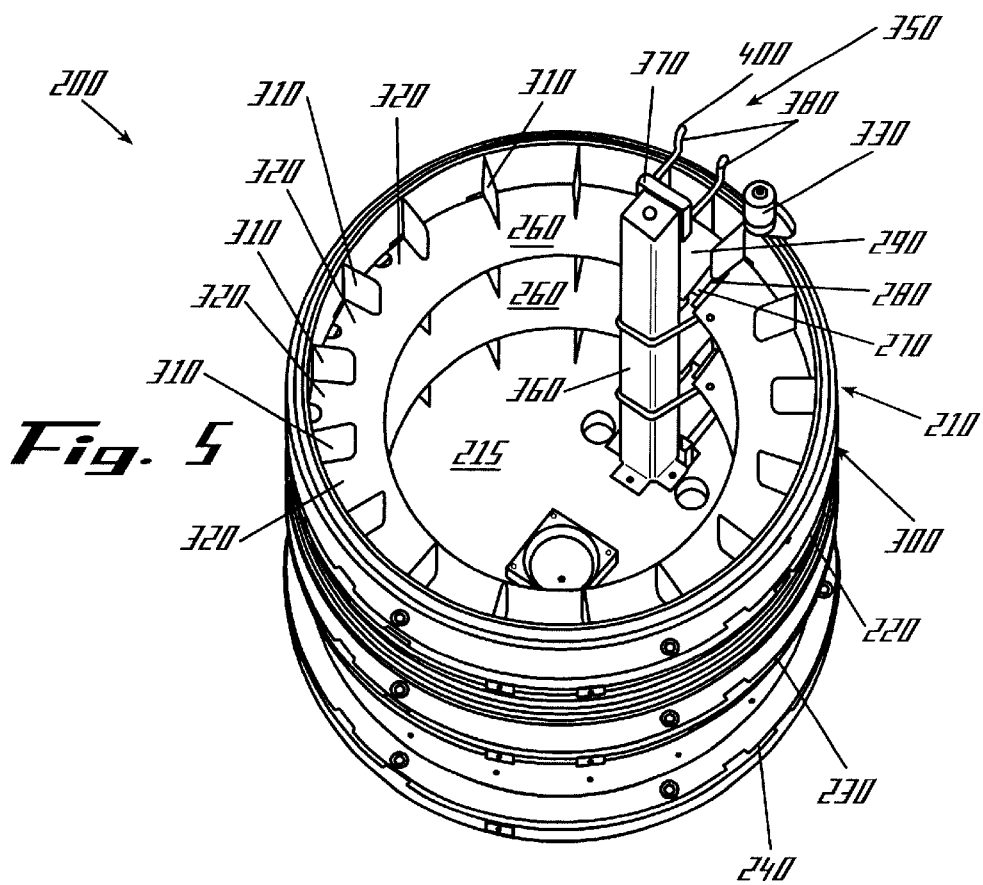
FIG. 5 is a top perspective view of the storage and elevation system of the mobile vendor of FIG. 1.
Figure 6:
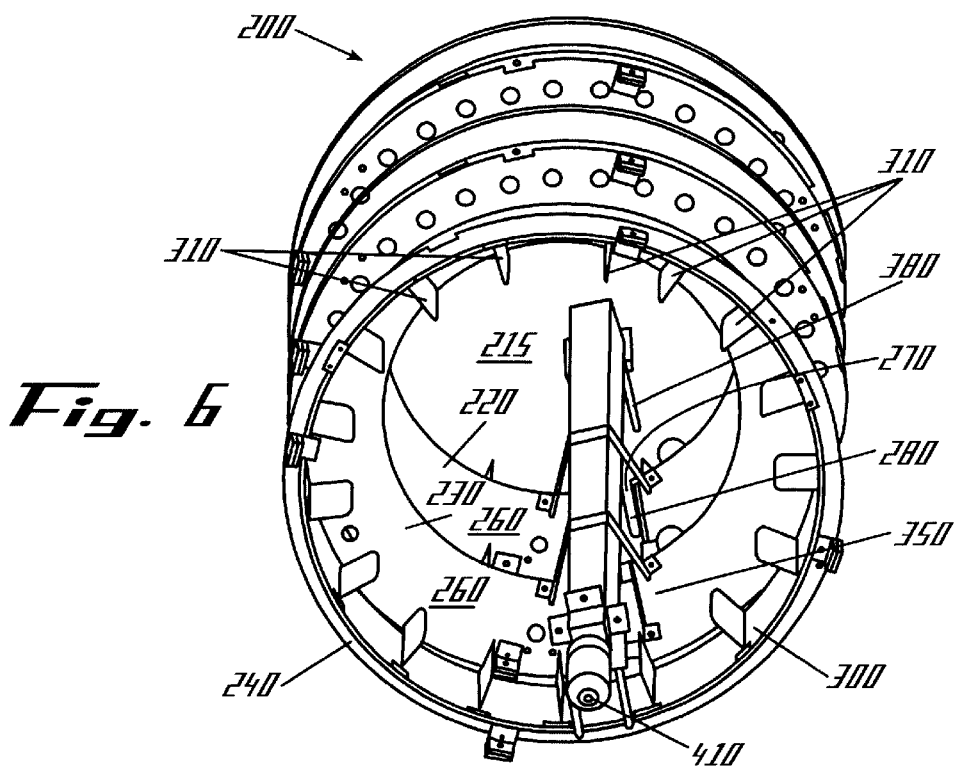
FIG. 6 is a bottom perspective view of the storage and elevation system of the mobile vendor of FIG. 1.

As is shown in FIGS. 4–6, the mobile vendor 100 may include a storage and elevation system 200. The storage and elevation system 200 may include a number of storage rows 210. In the present embodiment, three storage rows 210 are used, a first storage row 220, a second storage row 230, and a third storage row 240. Any number of storage rows 210, however, may be used. The storage rows 210 are largely circular in shape so as to fit within the outer shell 115. Any convenient size or shape, however, may be used. The storage rows 210 may each form a central aperture 215 therein. In this example, the aperture 215 is largely cylindrical in shape. Any size or shape, however, may be used. The apertures 215 may be filled with ice so as to keep the products 105 within the storage rows 210 cold. Alternatively, the mobile vendor 100 may use any type of conventional cooling or heating system.

Each of the storage rows 210 may include a fixed floor 260. The fixed floor 260 may be attached to an inner wall 265 of the outer shell 115. The floor 260 may include an elevator port 270. The elevator port 270 may include a pair of apertures 280. The apertures 280 may surround a product support flange 290. By a "pair" of apertures 280, we mean that the apertures 280 surround the support flange 290. The apertures 280 may or may not be contiguous. The apertures 280 may be sized to accommodate the elevator as described in more detail below. The product support flange 290 may be sized to accommodate and support one of the products 105. The product support flange 290 is rotatable and may be attached to the floor 260 via springs, hinges, or conventional type of joinder means.

Positioned on the floor 260 and within the inner wall 265 may be a rotatable inner collar 300. The rotatable inner collar 300 may rotate along the floor 260 by sliding or via rollers, bearings, or similar means. The rotatable inner collar 300 may include a number of partitions 310 thereon that form a number of product compartments 320. As is shown in FIG. 4, several of the products 105 may be positioned on the storage rows 210 in the product compartments 320. The inner collar 300 may be driven to rotate along the floor 260 by a collar motor 330. The collar motor 330 may be a conventional electric motor with about 0.01 to about 0.2 horsepower. The collar motor 330 may also include other types of conventional drive means. When the products 105 are positioned within the compartments 320, the partitions 310 of the inner collar 300 force the products 105 to slide along the floor 260 and the inner wall 265. An internal control device 340 may control operation of the motor 330. The internal control device 340 may include a conventional microprocessor or a similar type of control device.

The storage and elevation system 200 also may include an elevator 350. The elevator 350 may include an elongated shaft 360. The elongated shaft 360 may be fixedly attached to each of the floors 260 of the storage rows 210 by brackets or similar types of connection mechanisms. Attached to the elongated shaft 360 may be an elevator base 370 with a pair of elevator arms 380 attached thereto. The elevator base 370 and the elevator arms 380 may maneuver up and down the elongated shaft 360. The elevator base 370 may have a flange or other type of guide mechanism so as to attach to the elongated shaft 360 for movement therewith. The elevator base 370 may be of sufficient size to support the elevator arms 380 with a product 105 therein.

The elevator arms 380 each may have an elongated straight portion 390 attached to the base 370 and an angled portion 400 extending toward the outer shell 115. The straight portion 390 is essentially the width of one of the products 105. The elevator arms 380 are sized to maneuver up and down the elongated shaft 360 and through the apertures 280 of the elevator port 270 on each storage row 210. The elevator arms 380 may travel through the apertures 280 until the arms engage one of the products 105 positioned on the support flange 290. The elevator arms 380 may then pick up the product 105 and support it against the elevator base 370. The elevator arms 380 may be made out of a substantially rigid material such as stainless steel or similar types of materials.

The elevator base 370 and the elevator arms 380 may maneuver up and down the elongated shaft 360 as powered by an elevator motor 410. The elevator motor 410 may be an electrical motor with about 0.01 to about 0.25 horsepower or a similar type of drive mechanism. The internal control device 340 may control the elevator motor 410.

Figure 3:
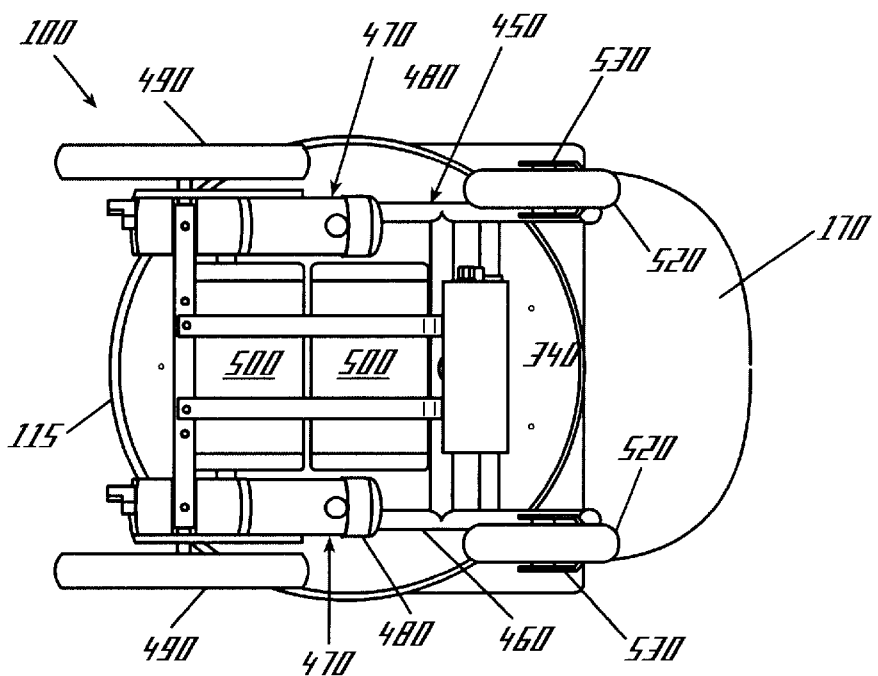
FIG. 3 is a bottom plan view of the mobile vendor of FIG. 1.
Figure 7:
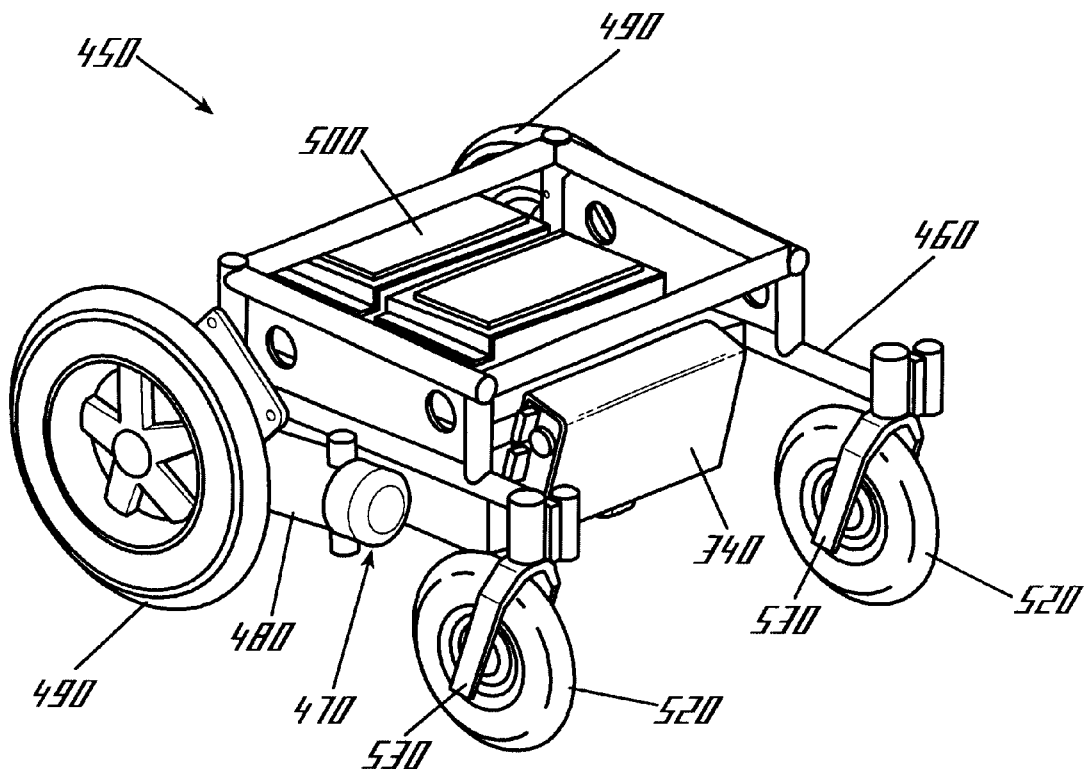
FIG. 7 is a perspective view of the drive system of the mobile vendor of FIG. 1.
Figure 8:
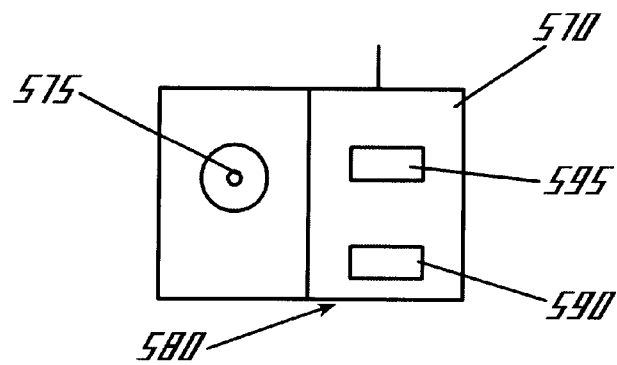
FIG. 8 is a plan view of the remote control device for use with the mobile vendor.

The mobile vendor 100 may further include a transport system 450. As is best shown in FIGS. 3, 4, and 7, the transport system 450 may be based upon a typical wheelchair transport system. As such, the transport system 450 may include a frame 460. The frame 460 may include tubular elements made from aluminum, or similar types of low weight, high strength materials. Attached to the rear of the frame 460 may be a drive mechanism 470. The drive mechanism 470 may include a pair of drive motors 480 positioned on either side of the frame 460. Also attached to the frame 460 are the rear wheels 490. The drive motors 480 drive the rear wheels 490 in a conventional manner. Further, the drive motors 480 may include a gearbox, a clutch, mounting brackets, and similar types of drive components. The drive motors 480 may have a power output of about 0.5 to about 1.5 horsepower. One or more batteries 500 may power the drive motors 480. The batteries 500 may be conventional lead-acid, nickel cadmium, metal-air, or similar types of low weight, long run time energy sources. The batteries 500 are preferably re-chargeable.

Attached to the front of the frame 460 may be a pair of front wheels 520 connected by a pair of steering brackets 530. The front wheels 520 may be of conventional design. The front wheels 520 may be mounted on the steering brackets 530 in a conventional manner. The steering brackets 530 may be made out of steel or similar types of rigid materials. The steering brackets 530 may be connected to the frame 460 in a conventional manner. The wheels 520 may be generally passive with respect to steering. Steering may be provided by altering the speed of the rear wheels 490. For example, the frame 460 will turn to the left by increasing the speed to the right rear wheel 490. Any conventional type of steering mechanism also may be used.

The internal control device 340 may operate in conjunction with a remote control device 570. The internal control device 340 and the remote control device 570 may communicate via radio frequency signals, infrared light, or via other conventional communication means. The internal control device 340 and the remote control device 570 also may be connected via cables or other types of direct connections.

The remote control device 570 may have a joystick 575 or a similar type of control mechanism so as to steer the mobile vender 100. The remote control device 570 also may control the speed of the mobile vendor 100, other aspects of the transport system 450, and the operation of the storage and elevation system 200.

The mobile vendor 100 may further include a communication system 580. Both the mobile vendor 100 and the remote control device 570 may include a microphone 590 and a speaker 595. Any conventional type of microphone 590 and speaker 595 may be used. The user of the remote control device 570 therefore may speak into the microphone 590 of the remote control device 570 such that it appears that the mobile vendor 100 is speaking. Likewise, the consumer may speak into the microphone 590 of the mobile vendor 100 and have that speech heard by the user of the remote control device 570 via the speaker 595. The microphone 590 and the speaker 595 may be positioned within the access lid 120 or anywhere on the mobile vendor 100. The mobile vendor 100 thus may be interactive with the consumer.

In use, a number of the products 105 may be loaded into each of the product compartments 320 on the storage rows 210. A different type or flavor of product 105 may be inserted on each row 210. For example, a regular carbonated beverage product 105 may be placed in the first storage row 220, a diet carbonated beverage product 105 may be placed on the second storage row 230, and a water product 105 may be placed on the third storage row 240. Any number of product variations may be used. The apertures 215 within the storage rows 210 may be filled with ice or other types of heating or cooling devices may be used to bring the products 105 therein to the desired serving temperature.

Under the direction of the remote control device 570, the mobile vendor 100 may travel to wherever the consumers may be gathered. For example, the consumers may be waiting in line at an amusement park, a sporting event, a concert, or at a similar type of event or attraction. The user of the remote control device 570 may control the transport system 450 such that the mobile vendor 100 travels along the line of consumers. The user of the remote control device 570 also may use the microphone 590 and the speaker 595 so as to interact with the consumers in line and to gain their attention.

For example, the mobile vendor 100 may stop in front of a consumer. The consumer may place coins, coupons, or currency into the coin slot 160 and then make a selection from the selection panel 150. The selection panel 150 thus activates the internal control device 340 to turn on the collar motor 330 of the storage row 210 with the products 105 thereon that correspond to the selection of the selection panel 150. The collar motor 330 rotates the inner collar 300 until one of the products 105 is positioned on the product support flange 290 of the elevator port 270. The elevator 350 is then activated such that the elevator arms 380 travel through the apertures 280 and pick up the selected product 105. The product 105 is then elevated through the access port 130 and the vending lid 140 of the access lid 120. The product support flange 290 of the other storage rows 210 rotates upward as the elevator 350 passes therethrough. The consumer may then remove the product 105 from the access port 130. The mobile vendor 100 may then continue down the line of consumers and repeat the sales process.

FIGS. 9–21 show another embodiment of the present invention, a remote vendor system 600. The remote vendor system 600 may include a control system 610. The control system 610 coordinates and activates each of the elements within the remote vendor system 600 as a whole as is described in more detail below. The control system 610 may include a conventional microprocessor or a similar type of control system. The control system 610 may be similar to the control system 340 described above.

The remote vendor 600 may include a product storage device 620. The product storage device 620 may be a conventional vending machine 630. For example, the vending machine 630 may be made by The Vendo Company of Fresno, Calif. The vending machine 630 may vend products 105 from the front via a front chute 640 in a conventional manner. The vending machine 630 preferably also may vend products 105 via a rear chute 650. Alternatively, the vending machine 630 may be oriented such that the front chute 640 is used with the remote vendor 600. The vending machine 630 may be refrigerated or heated as desired. Activation of the vending machine 630 may be controlled by the control system 610.

The remote vendor system 600 also includes a delivery system 660. As is shown in FIG. 9, the delivery system 660 may include a vertical conveyor 670. The vertical conveyor 670 may be positioned adjacent to the rear chute 650 of the vending machine 630. The vertical conveyor 670 may include a frame 680. The frame 680 may include a pair of parallel rails 690 with a platform 700 positioned in-between for movement up and down the rails 690. The rails 690 may be made out of any type of rigid material, such as aluminum, steel, stainless steel, or plastic. The platform 700 may maneuver along the rails 690 by a pulley system 710.

The pulley system 710 may include a pulley wire 720 positioned along one or more pulley wheels 730. The pulley wire 720 may be made out of wire rope, stainless steel, or other types of conventional materials. One of the pulley wheels 730 may be positioned at the top end of the vertical conveyor 670 and one of the pulley wheels 730 may be positioned at the bottom end of the conveyor 670 below the rear chute 650 of the vending machine 630. Specifically, one of the pulley wheels 730 may be positioned at the top of the rails 690 such that as the platform 700 rises up the rails 690 and then rotates from a horizontal position to a vertical position as it passes over the pulley wheel 730. A pulley motor 740 may engage the pulley wire 720 so as to raise and lower the platform 700. The pulley motor 740 may be a conventional electric motor with about one-tenth or one-eighth horsepower or the like. Operation of the pulley motor 740 may be controlled by the control system 610.

The delivery system 660 also may include a horizontal track 760. The horizontal track 760 may be made out of any substantially rigid material such as aluminum, steel, stainless steel, or similar materials. The horizontal track 760 may be substantially U-shaped in cross-section with two bottom lips 770 forming an aperture 780. Preferably, the bottom lips 770 and the aperture 780 are spaced so as to accommodate the product 105. Specifically, the neck ring of the typical beverage bottle 110 may be supported by the horizontal track 760. The horizontal track 760 may be angled with a high end 790 adjacent to the vertical conveyor 670 such that the products 105 may slide from the vertical conveyor 670 and the high end 790 along the horizontal track 760 to a lower end 795. The horizontal track 760 may have about a drop of about five (5) to about ten (10) degrees with a drop of about seven degrees (7°) preferred.

Alternatively, a powered transport device 800 may be used. The transport device 800 may be a small electrically operated or battery operated device with wheels or a track and with a coupling 805 for accepting one of the products 105. The transport device 800 may be positioned within the aperture 780 of the horizontal track 760. The coupling 805 of the transport device 800 may accept one of the products 105 as it emerges from the vertical conveyor 670. The transport device 800 may then carry the product 105 down the horizontal track 760. If the powered transport device 800 is used, the horizontal track 760 need not be inclined. Operation of the transport device 800 may be controlled by the control system 610.

The delivery system 660 also may have one or more directional switches 810. The directional switches 810 may guide one of the products 105 from the horizontal track 760 to either a drop mechanism 820 or to a further horizontal track 830. Operation of the switch 810 may be controlled by the control system 610. The switch 810 may be mounted to the horizontal track 760, the further horizontal track 830, and a support structure 835. The switch 810 may include a piston 840 or a similar device so as to push the horizontal track 760 either towards the drop mechanism 820 or towards the further horizontal track 830. The piston 840 may push the horizontal track 760 about 1.5 to about 2.0 inches into position adjacent to the drop mechanism 820 or the further horizontal track 830.

When the piston 840 is extended as is shown in FIG. 13, the horizontal track 760 aligns with the drop mechanism 820 and delivers one of the products 105 thereto. When the piston 840 is in the retracted position as is shown in FIG. 14, the horizontal track 760 aligns with the further horizontal track 830 such that the product 105 passes from the horizontal track 760 to the further horizontal track 830. Operation of the piston 840 may be controlled by the control system 610.

The further horizontal track 830 may lead to a further drop mechanism 825 or to another switch 810. Any number of switches 810, horizontal tracks 760, 830, and drop mechanisms 820, 825 may be used in the remote vending system 600 as a whole.

FIGS. 15 and 16 show the drop mechanism 820. The drop mechanism 820 may include an elongated tube 860. The elongated tube 860 may be made from any substantially rigid material such as aluminum, steel, stainless steel, or similar types of materials. The elongated tube 860 has a first end 870 and a second end 880. Positioned about the first end 870 may be a pulley 890. The pulley 890 may have a pulley cap 900 and a pulley wheel 910. A pulley cable 920 is positioned within the pulley wheel 910 for movement thereon. The pulley cable 920 may be made out of wire rope, stainless steel, or other types of conventional materials. Positioned within the elongated tube 860 is a counter-weight 930. The counter-weight 930 may be made out of brass, bronze, or similar types of materials. The counter-weight 930 preferably weighs about one pound. The counter-weight 930 may have a piston 935 positioned thereon. The piston 935 may be mounted at the top of the counter-weight 930 so as to slow the ascent of the counter-weight 930 as it rises near the end of its travel. The pulley 890 may have an internal bore (not shown) therein in communication with the elongated tube 860. As the piston 935 and the counter-weight 930 rise within the elongated tube 860, the piston 935 enters the bore and may be slowed due to restricted airflow therein. The counter-weight 930 is attached to the pulley cable 920.

Positioned about the elongated tube 860 may be a product holder 940. The product holder 940 may include a roller assembly 950. The roller assembly 950 may include a tube 960 with an upper roller cap 970 and a lower roller cap 980.

The roller caps 970, 980 may include one or more rollers 990 or bearings therein so as to reduce friction on the product holder 940 as it moves down the elongated tube 860. The pulley cable 920 may be attached to the roller assembly 950 at or near the upper roller cap 970.

The product holder 940 also may include a bottle holder 991. The bottle holder 991 may have two fixed forks 992. The fixed forks 992 may support the product 105. Specifically, the fixed forks 992 may support the neck ring of the beverage bottle 110 therein. The fixed forks 992 may be configured so as to support any type of product 105. The forks 992 may be made out of acetal, polycarbonate, or similar materials. Once the fixed forks 992 support the product 105, the combined weight of the product holder 940 and the product 105 should be sufficient to overcome the weight of the counter-weight 930. The product holder 940 and the product 105 thus descend down to the second end 880 of the elongated tube 860.

The second end 880 of the elongated tube 860 preferably is fixedly attached to a table or another structure via a base 993. The product holder 940 and the product 105 will remain at the second end 880 of the elongated tube 860. Once the consumer removes the product 105 from the fixed forks 992, the counter-weight 930 again raises the product holder 940 to the first end 870 of the elongated tube 860.

Figure 17:
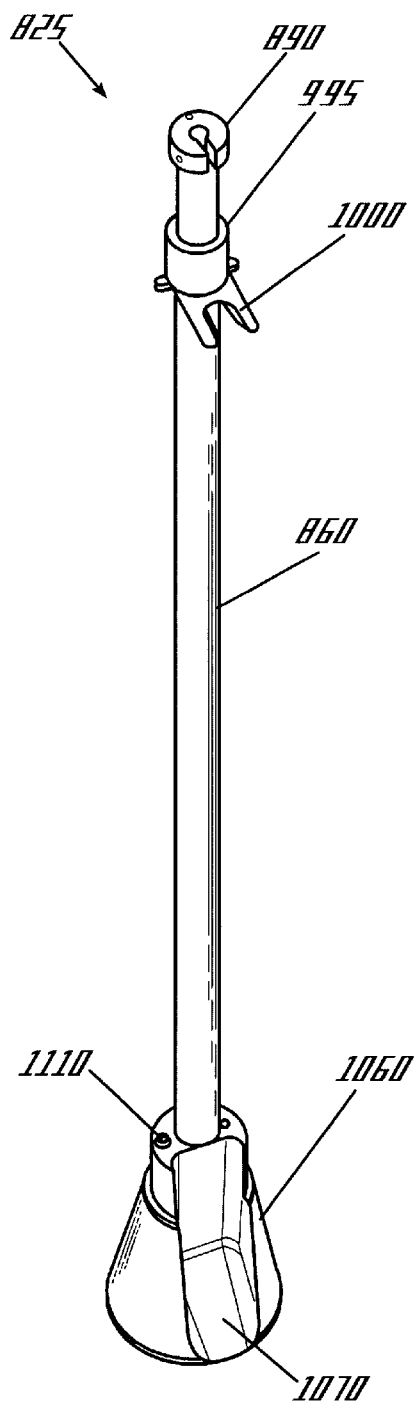
FIG. 17 is a perspective view of a further drop mechanism of the remote vending system of FIG. 9.
Figure 18:
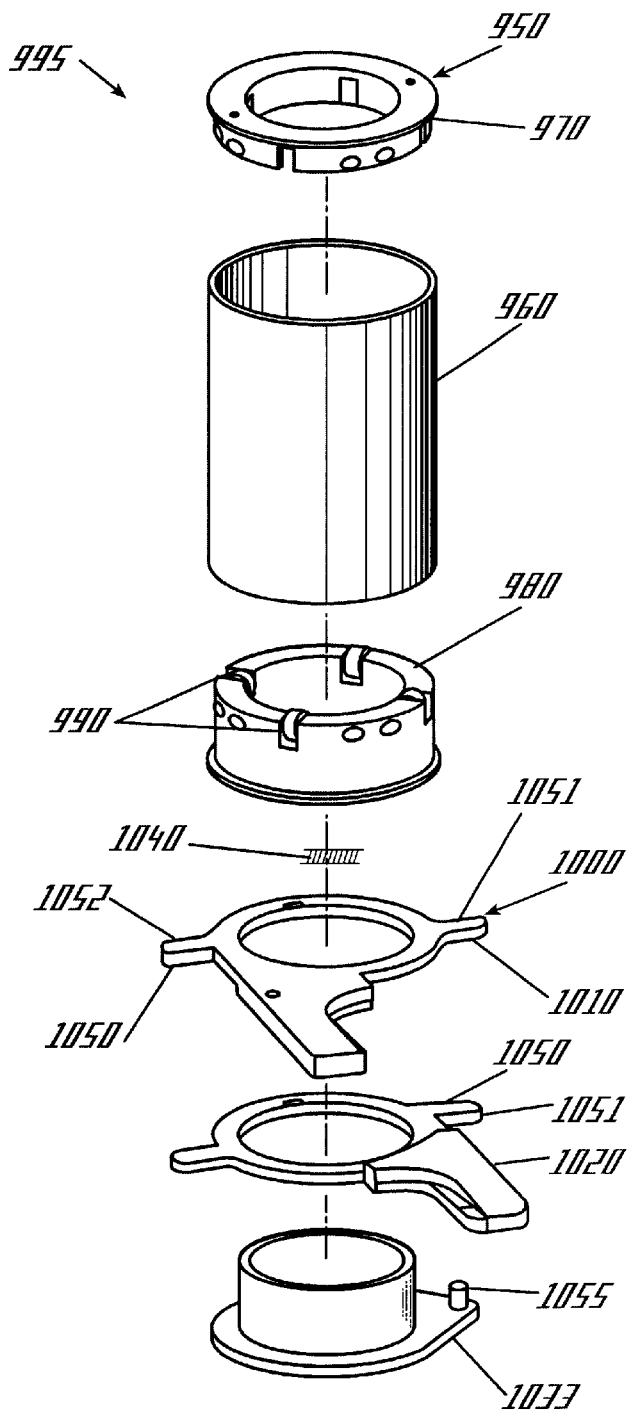
FIG. 18 is an exploded view of the bottle fork assembly of the further drop mechanism of FIG. 17.
Figure 19:
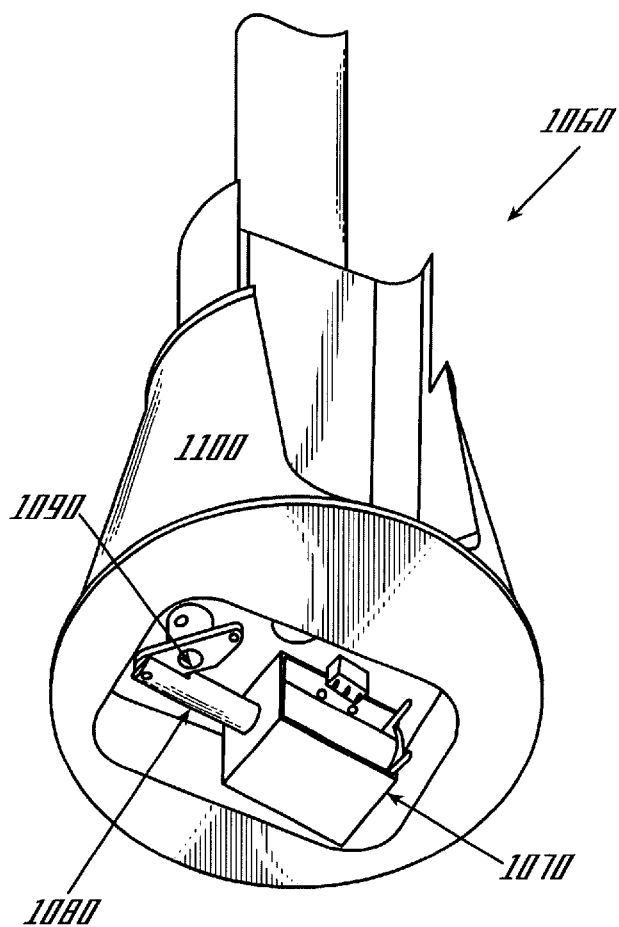
FIG. 19 is a perspective view of the bottom end of the base cone of the further drop mechanism of FIG. 17.

FIGS. 17–19 show a further drop mechanism 825 positioned at the end of the further horizontal track 830. The further drop mechanism may use an identical elongated tube 860 and pulley 890 with a second product holder 995. Instead of the bottle holder 991 of the product holder 940, the second product holder 995 may use a bottle fork assembly 1000. The bottle fork assembly 1000 may include a first bottle fork 1010 and a second bottle fork 1020. The bottle forks 1010, 1020 also may be configured to support any type of product 105. The forks 1010, 1020 may be made out of acetal, polycarbonate, or similar materials.

The bottle forks 1010, 1020 may be positioned on a bottle fork base 1030. The bottle forks 1010, 1020 are maneuverable about the bottle fork base 1030. The bottle forks 1010, 1020 may be spring loaded by a spring 1040. The bottle forks 1010, 1020 may be biased by the spring 1040 in the closed position. In other words, the bottle forks 1010, 1020 will resemble the fixed forks 992 described above when in the closed position. The bottle forks 1010, 1020 also may have one or more flanges 1050 on the rear thereof so as to form a first side flange assembly 1051 and a second side flange assembly 1052. A pin 1055 may halt the movement of the bottle forks 1010, 1020 about the base 1030.

Positioned on the second end 880 of the elongated tube 860 on the further drop mechanism 825 may be a base cone 1060. The base cone 1060 may be made out of a substantially rigid material such as a thermoplastic or similar materials. The base cone 1060 may include a cutout 1070 for the delivery of one of the products 105 within the product holder 995. As is shown in FIG. 19, a solenoid 1070 may be positioned within the base cone 1060. The solenoid 1070 may be of conventional design and provides for reciprocating movement. Attached to the solenoid 1070 may be a plunger 1080. The plunger 1080, in turn, may be attached to a fork flipper assembly 1090. The fork flipper assembly 1090 may include a shaft 1100 attached to the plunger 1080 and to an elongated flipper 1110. The elongated flipper 1110 extends on the top of the base cone 1060. The flipper 1110 is capable of rotation. The solenoid 1070 may be activated by a switch 1120 positioned on the base cone 1060 on the opposite side of the elongated tube 860 from the flipper 1110. The flipper 1110 is sized to fit within the first side flange assembly 1050 of the bottle fork assembly 1000.

When the second product holder 995 descends onto the base cone 1060, the flipper 1110 is positioned within the first side flange assembly 1051 of the bottle fork assembly 1000. Activation of the switch 1120 by the bottle fork base 1030 causes the solenoid 1070 to operate and the flipper 1110 to rotate. This rotation opens the first side flange assembly 1051 and hence the bottle forks 1010, 1020. The bottle forks 1010, 1020 thus release the product 105. Once the product 105 is released, the counter-weight 930 again raises the second product holder 995 to the first end 870 of the elongated tube 860.

Figure 20:
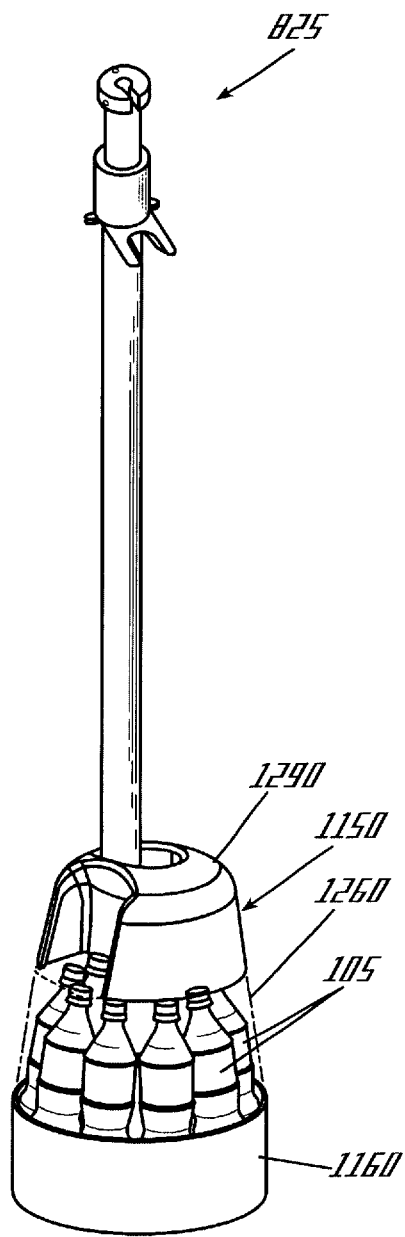
FIG. 20 is a perspective view of the product dispenser of the further drop mechanism of FIG. 17.
Figures 21, 22:
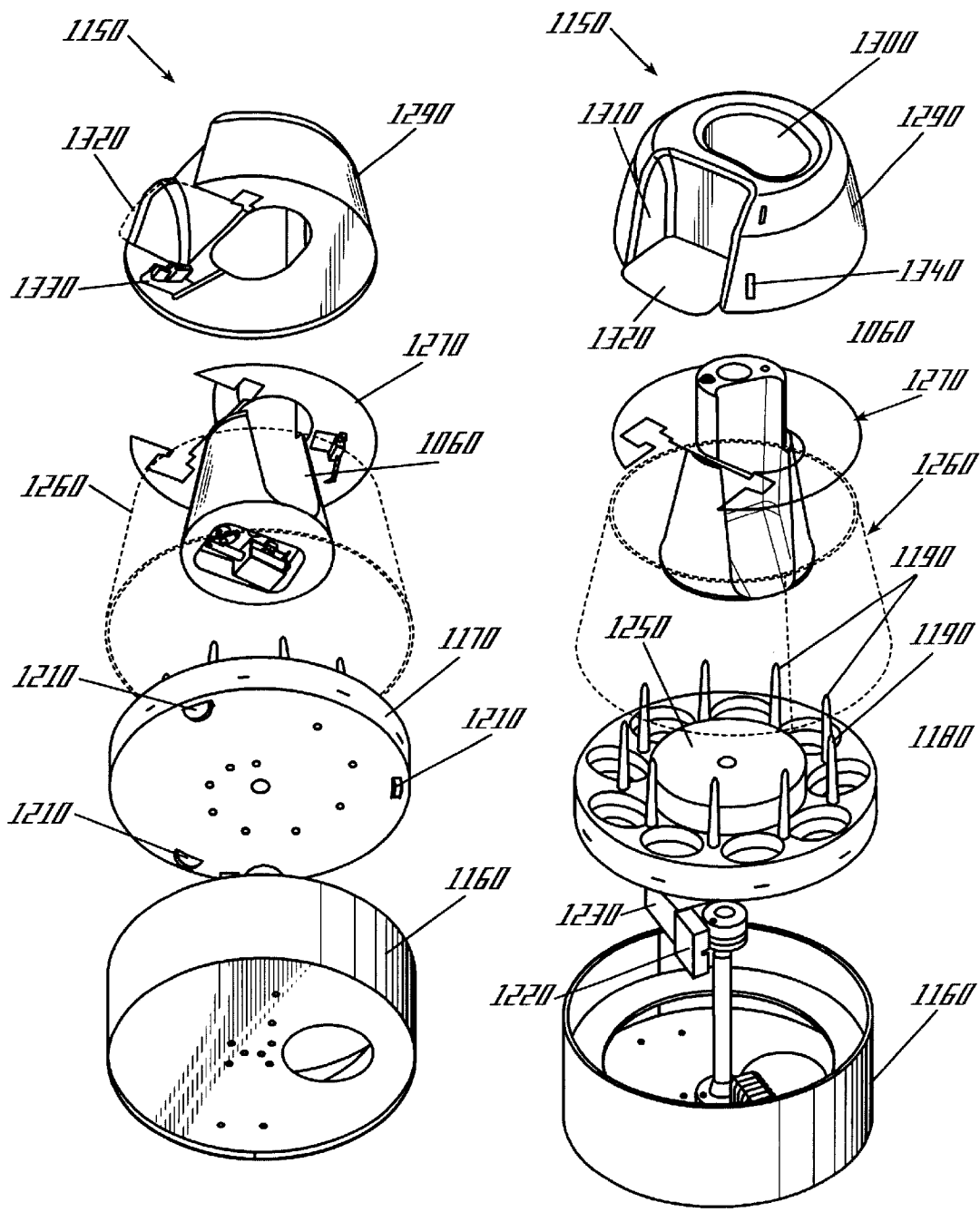
FIG. 21 is a top exploded view of the product dispenser of FIG. 20.
FIG. 22 is a bottom exploded view of the product dispenser of FIG. 20.

As is shown in FIGS. 20–22, the further drop mechanism 825 may be mounted onto a product dispenser 1150. The product dispenser 1150 may surround at least the base cone 1060 portion of the further drop mechanism 825. The product dispenser 1150 may include a dispenser base 1160. The dispenser base 1160 may be made out of any substantially rigid material, such as a thermoplastic, steel, or similar materials.

Positioned within the dispenser base 1160 may be a product platter 1170. The product platter 1170 also may be made from a substantially rigid material, such as a thermoplastic, aluminum, or similar materials. The product platter 1170 may have a number of product basins 1180 formed therein. The product basins 1180 may be sized to support the products 105. The product platter 1170 also may have a number of divider pins 1190 formed therein or attached thereto. The divider pins 1190 ensure that the products 105 positioned within the product basins 1180 remain separated and supported.

The product platter 1170 may be positioned within the product dispenser base 1160 via a spindle 1200. The product platter 1170 may rotate about the spindle 1200. The product platter 1170 also may have a number of platter rollers 1210 positioned thereon. The platter rollers 1210 may assist in the rotation of the product platter 1170. The product platter 1170 may be motorized via a drive motor and gear assembly 1220. The drive motor and gear assembly 1220 may include a conventional electric motor 1230 or a similar type of drive device. Rotation of the product platter 1170 and the operation of the drive motor and gear assembly 1220 may be controlled by a number of switches 1240 positioned within the dispenser base 1160. The switches 1240 may be conventional position switches. The switches 1240 may determine whether a product 105 is in position in each product basin 1180. Monitoring of the switches 1240 and operation of the drive motor and gear assembly 1220 may be controlled by the control system 610.

Positioned on top of the product platter 1170 may be a drop mechanism base 1250. The drop mechanism base 1250 may be fixedly attached to the platter 1170. The base cone 1060 may be positioned on top of the base 1250. The dispenser base 1160 also supports a product cone 1260. The product cone 1260 is preferably made from a clear thermoplastic such that a consumer may view the products 105 positioned within the product basins 1180. Mounted on top of the product cone 1260 may be a plate 1270. The plate 1270 may be made out of sheet metal or any other substantially rigid material. The plate 1270 may have a number of apertures 1280 therein so as to allow removal and insertion of the products 105 into and out of the product platter 1170.

Positioned on top of the plate 1270 may be a vending cone 1290. The vending cone 1290 may be made out of a substantially rigid material, such as a thermoplastic, aluminum, or similar materials. The vending cone 1290 may have an aperture 1300 for the base cone 1060 of the drop mechanism 825 and a second aperture 1310 so as to provide access to the products 105 within the product dispenser 1150. The second aperture 1310 may be enclosed with a vending door 1320. The vending door 1320 also may be made out of a substantially rigid thermoplastic or similar materials. Operation of the vending door 1320 may be controlled by a vend door switch 1330. The vend door switch 1330 may be operated by the insertion of coins or currency into a coin slot 1340. The coin slot 1340 may be positioned on the vending cone 1290 or anywhere on the product dispenser 1150. The vend door 1320 also may be operated by the control system 610. The product dispenser 1150 may be positioned on a base 1350 of suitable height and dimensions. As is shown in FIG. 9, the base 1350 may include a rack 1360 for magazines, candy, or other types of consumer goods.

In use, the product platter 1170 of the product dispenser 1150 may rotate via the drive motor and gear assembly 1220. A consumer can pay for the product 105 at the time or take the product 105 to a checkout line. The consumer may place coins or currency within the coin slot 1340 or the customer may simply open the vending door 1320 to remove one of the products 105 out of one of the product basins 1180. The rotation of the product platter 1170 stops when the vend door switch 1330 is activated as the vending door 1320 opens. Once the product 105 has been removed from one of the product basins 1180, the appropriate switch 1240 signals the control system 610 that the product 105 has been removed. Each product basin 1180 may contain a specific product 105 such that the control system 610 knows what type of product 105 has been removed.

The control system 610 then activates the vending machine 630. A further product 105 is dispensed out of the rear chute 650 and onto the platform 700 of the vertical conveyor 670 of the delivery system 600. The pulley motor 740 is activated so as to raise the platform 700 via the pulley system 710. Once the platform 700 is raised to the top of the rail 690, the platform 700 rotates the product 105 from a horizontal position to a vertical position where the product 105 is captured by the horizontal track 760.

The product 105 then moves down the horizontal track 760 under the force of gravity or via the powered transport device 790. The product 105 continues down the horizontal tract 760 to the switch 810. The control system 610 determines whether the product 105 should exit onto the drop mechanism 820 or continue down the further horizontal track 830. Alternatively, the horizontal tract 760 may lead directly to the drop mechanism 820.

In this case, the switch 810 shifts the product 105 down the further horizontal tract 830 to the second drop mechanism 825 because the product 105 is intended to refill the empty product basin 1180 of the product dispenser 1150. The product 105 continues into the second product holder 995 of the further drop mechanism 825. The product 105 is secured between the bottle forks 1010, 1020 as the product holder 995 moves down the elongated tube 860 via the pulley system 890. The product holder 995 continues down to the base cone 1060 where the bottle fork base 1030 of the bottle forks 1010, 1020 activates the switch 1120. The switch 1120, in turn, activates the solenoid 1070 so as to cause the flipper 1110 to open the first side flange assembly 1051 and the bottle forks 1010, 1020. As the bottle forks 1010, 1020 open, the product 105 falls into the product basin 1180 of the product dispenser 1150. While the product 105 is being delivered to the product dispenser 1150, the drive motor gear assembly 1220 rotates the product platter 1170 into position adjacent to the aperture 1300 of the base cone 1060. The product 105 then falls into the appropriate product basin 1180. Once the product 105 has been delivered, the drive motor and gear assembly 1220 again rotate the product platter 1170.

Alternatively, the product 105 may descend down the horizontal tract 760 to the switch 810. The switch 810 may cause the product 105 to fall into the drop mechanism 820. The product holder 940 of the drop mechanism 820 then descends down the elongated tube 860 where the consumer may remove the product 105 by hand. The product holder 105 then returns up the elongated tube 860 under the force of the counter-weight 930 once the product 105 has been removed.

The remote vendor 600 thus not only ensures that the product dispenser 1150 is always filled with the products 105, but also ensures that the delivery of the products 105 will catch the consumer's eye and attract further purchases of the products 105. It is important to note that although the remote vendor 600 has been described with respect to the use of the beverage bottle 110, the product 105 may be any type of package, goods, foods, beverages, etc. Further, the vending machine 630 and the product dispenser 1150 may be heated or refrigerated as appropriate.

Figure 23:
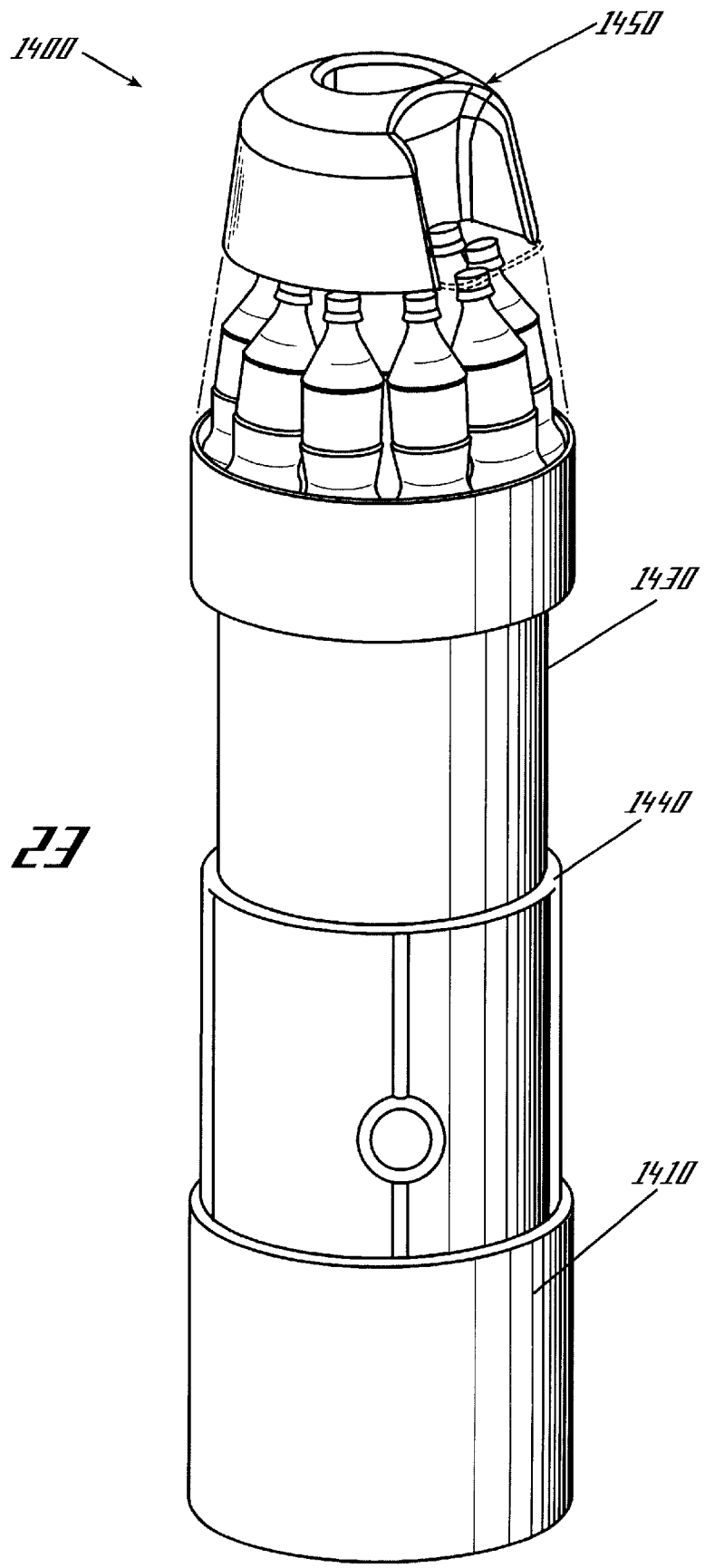
FIG. 23 is a perspective view of the partner cooler of the present invention.
Figure 24:
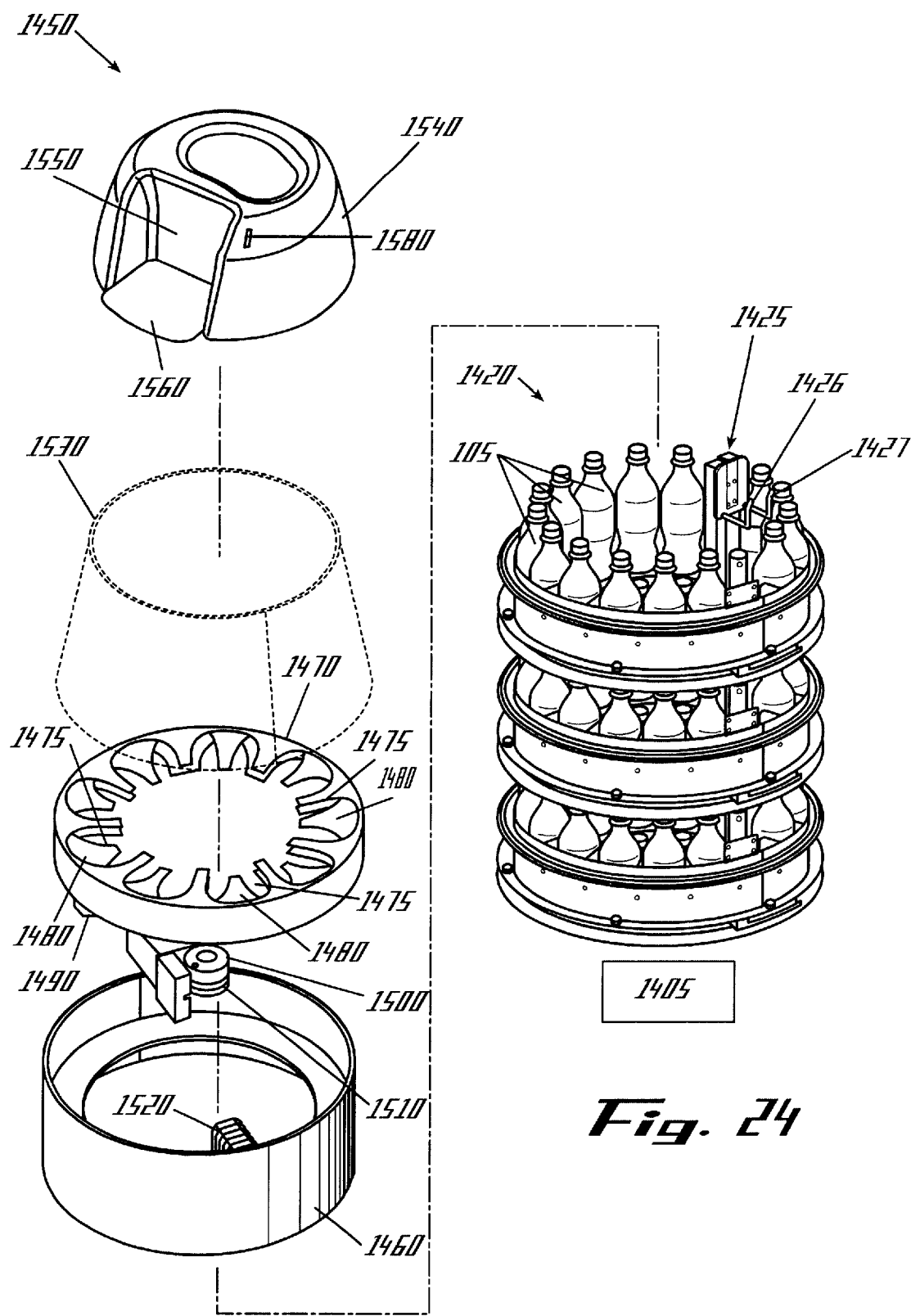
FIG. 24 is an exploded view of the partner cooler of FIG. 23.

FIGS. 23–24 show a further embodiment of the present invention, a partner cooler 1400. Operation of the partner cooler 1400 may be controlled by a control system 1405. The control system 1405 may be similar to the control systems 340, 610. The partner cooler 1400 may incorporate the storage and elevation system 200 of the mobile vendor 100 with the some or all of the exterior appearance of the product dispenser 1150 of the remote vendor 600. Specifically, the partner cooler 1400 may include a support base 1410. The support base 1410 may be sized according to the desired size of the partner cooler 1400 as a whole. The support base 1410 may be made out of any conventional material and can be made in any conventional shape. Mounted to the support base 1410 may be a storage and elevation system 1420. The storage and elevation system 1420 may be substantially identical to the storage and elevation system 200 described above. As such, the storage and elevation system 1420 may include an elevator 1425 with a base 1426 and a pair of arms 1427 similar to those described above with the elevator 350.

An outer shell 1430 may enclose the storage and elevation system 1420. The outer shell 1430 may be similar to the outer shell 115 described above. The outer shell 1430 may be made out of any conventional materials such as steel, aluminum or similar metals; a thermoplastic such as polycarbonate or PETG; or similar materials. The outer shell 1430 is preferably insulated. Positioned on the outer shell 1430 may be one or more promotion racks 1440. The promotion racks 1440 may hold magazines, books and newspapers, candy, or any type of consumer goods or other items. The promotion racks 1440 may be conventional shelving. The promotional racks 1440 made out of metal wire or any conventional type of materials may be used. Any conventional shape also may be used. The outer shell 1430 also may include advertising indicia thereon.

Positioned on top of the storage and elevation system 1420 may be a product dispenser 1450. The product dispenser 1450 may have a similar exterior appearance to that of the product dispenser 1450 described above. As such, the product dispenser 1450 may include a dispenser base 1460 similar to the dispenser base 1160 described above. The dispenser base 1460 may be made out of any substantially rigid materials, such as a thermoplastic, steel, or similar materials.

Positioned within the dispenser base 1460 may be a product platter 1470. The product platter 1470 may be somewhat similar to the product platter 1170 described above. The product platter 1470 may have a number of apertures 1475 therein. The apertures 1475 may be sized to accommodate one of the products 105 and the elevator arms 1427 passing therethrough. A product support 1480 may be positioned within each of the apertures 1475. The product supports 1480 may be rotatably attached to the product platter 1470. The product supports 1480 are formed so as to support one of the products 105 and also to allow one of the products 105 to be elevated from the storage and elevation system 1420. The product supports 1480 preferably do not fill each aperture 1475 completely. Rather, sufficient space remains for the elevator arms 1427 to pass therethrough. Springs, hinges, or other conventional types of joinder means may attach the product supports 1480 to the product platter 1470. The product platter 1470 and product supports 1480 may be made from a substantially rigid material, such as a thermoplastic, steel, or similar materials.

The product platter 1470 also may have a number of platter rollers 1490 positioned thereon. The platter rollers 1490 may be similar to the platter rollers 1210 described above. The platter rollers 1490 may assist in the rotation of the product platter 1470 within the dispenser base 1460. The product platter 1470 may be driven via a drive motor and gear assembly 1500 similar to the drive motor and gear assembly 1220 described above. The drive motor and gear assembly 1500 may include a conventional electric motor 1510 or a similar type of drive device. Rotation of the product platter 1470 and the operation of the drive motor and gear assembly 1500 may be controlled by a number of switches 1520 positioned within the dispenser base 1460. The switches 1520 may be conventional position switches. The switches 1520 may indicate whether a product 105 is in position in each of the product supports 1480. Monitoring of the switches 1520 and operation of the drive motor and gear assembly 1500 may be controlled by the control system 1405.

The dispenser base 1460 also may support a product cone 1530, similar to the product cone 1260 described above. The product cone 1530 is preferably made from a clear thermoplastic such that a consumer may view the products 105 positioned within the product supports 1480. Positioned on top of the product cone 1530 may be a vending cone 1540 similar to the vending cone 1290 described above. The vending cone 1540 may be made out of a substantially rigid material, such as a thermoplastic, or similar materials. The vending cone 1540 may have an aperture 1550 positioned therein. The aperture 1550 may be sized to permit the removal of one of the products 105 therethrough. The aperture 1550 may be enclosed with a vending door 1560 similar to the vending door 1320 described above. The vending door 1560 also may be made out of a substantially rigid thermoplastic or similar materials. Operation of the vending door 1560 may be controlled by a vend door switch or a similar mechanism. The vending door 1560 may be operated by insertion of coins or currency into a coin slot 1580. The coin slot 1580 may be positioned on the vending cone 1540 or anywhere on the product dispenser 1450. Operation of the vending door 1560 also may be controlled by the control system 1405.

In use, the drive motor and gear assembly 1500 may rotate the product platter 1470 of the product dispenser 1450. If a consumer desires one of the products 105 from the partner cooler 1400, the consumer can pay for the product 105 at the time or take the product 105 to a checkout line. The consumer may place coins or currency within the coin slot 1580 or the customer may simply open the vending door 1560 and remove one of the products 105 out of one of the product supports 1480. The rotation of the product platter 1470 stops when the vending door 1560 is opened.

Once the product 105 has been removed from one of the product supports 1480, the switch 1520 signals the control system 1405 that the product 105 has been removed. Each product support 1480 may be dedicated to a specific product 105 such that the control system 1405 knows what type of product 105 has been removed. Once the vending door 1560 has been closed, the control system 1405 activates the storage and elevation system 1420. The product platter 1470 is also rotated such that the empty product support 1480 is aligned with the elevator 1425. The elevator 1425 of the storage and elevation system 1420 picks up one of the products 105 in a manner largely identical to that described above with respect to the storage and elevation system 200. As the product 105 is elevated, the top of the product 105 causes the empty product support 1480 to rotate upward. The elevator 1425 continues to elevate the product 105 above the product platter 1470 and into the vending cone 1540 until the product 105 has cleared the product support 1480. Once the product 105 clears the product support 1480, the product support 1480 swings backward and closes. The elevator 1425 then reverses direction and places the product 105 into the product support 1480. The arms 1427 of the elevator 1425 pass through the apertures 1475 surrounding the product support 1480. Once the product 105 has been delivered, the drive motor and gear assembly 1500 again rotates the product platter 1470.

The present invention thus provides a new and novel means to deliver vended products to consumers wherever they may be located. Further, the present invention provides a means to reload the product storage area in a unique and eye-catching manner. The present invention also provides a means to combine a vending machine with merchandising space so as to partner a vended product with another type of product.

It should be understood that the foregoing relates only to the preferred embodiments of the present invention and that numerous changes may be made herein without departing from the general spirit and scope of the invention as defined by the following claims.

We claim:

1. A mobile vending machine for vending a plurality of products, comprising:

a storage compartment for storing said plurality of products;

a dispensing mechanism associated with said storage compartment for dispensing said plurality of products to a vending area; and an electric drive mechanism;

said storage compartment positioned about said electric drive mechanism for movement therewith.

2. The mobile vendor of claim 1, wherein said storage compartment comprises a plurality of storage rows.

3. The mobile vendor of claim 2, wherein each of said plurality of storage rows comprises a wall and a floor.

4. The mobile vendor of claim 3, wherein said floor comprises an elevator port for use with said dispensing mechanism.

5. The mobile vendor of claim 4, wherein said elevator port comprises a plurality of apertures surrounding a support flange.

6. The mobile vendor of claim 5, wherein each of said plurality of storage rows comprises a collar for rotation within said wall and said floor.

7. The mobile vendor of claim 6, wherein said collar comprises a plurality of partitions therein, said plurality of partitions comprising a plurality of product compartments.

8. The mobile vendor of claim 7, wherein said dispensing mechanism comprises a collar motor so as to rotate said collar.

9. The mobile vendor of claim 8, wherein said dispensing mechanism comprises an access port for dispensing one of said plurality of products at a time.

10. The mobile vendor of claim 9, wherein said dispensing mechanism comprises an elevator so as to transport said one of said plurality of products from said storage compartment to said access port.

11. The mobile vendor of claim 10, wherein said elevator comprises a pair of elevator arms, said pair of elevator arms positioned so as to pass through said plurality of apertures of said elevator port.

12. The mobile vendor of claim 1, wherein said drive mechanism comprises a plurality of wheels.

13. The mobile vendor of claim 12, wherein said drive mechanism comprises a drive motor so as to power one or more of said plurality of wheels.

14. The mobile vendor of claim 13, wherein said drive mechanism comprises a battery.

15. The mobile vendor of claim 1, further comprising an internal control device for controlling said storage compartment, said dispensing mechanism, and said drive mechanism.

16. The mobile vendor of claim 15, further comprising a remote control device in communication with said internal control device such that said remote control device can control said drive mechanism.

17. The mobile vendor of claim 15, further comprising a remote control device in communication with said internal control device such that said remote control device can control said storage compartment and said dispensing mechanism.

18. The mobile vendor of claim 15, further comprising a first speaker and a first microphone.

19. The mobile vendor of claim 18, further comprising a second speaker and a second microphone, said second speaker and said second microphone positioned on said remote control device for communication with said first speaker and said first microphone.

20. The mobile vendor of claim 1, wherein said storage compartment comprises an outer shell with advertising indicia thereon.

21. A dispensing system for dispensing a plurality of products from a vending machine, comprising:
an elevator; and
a plurality of storage rows;
said plurality of storage rows comprising a wall and a floor;
said plurality of storage rows comprising an elevator port for use with said elevator; and
said plurality of storage rows comprising a collar for rotation within said wall and said floor;
said collar comprising a plurality of partitions therein, said plurality of partitions comprising a plurality of products compartments for rotating said plurality of products along said floor to said elevator port for transport by said elevator.

22. The dispensing system of claim 21, wherein said elevator port comprises a plurality of apertures surrounding a product support flange.

23. The dispensing system of claim 22, wherein said elevator comprises a pair of elevator arms, said pair of elevator arms positioned to pass through said plurality of apertures of said elevator port and to pick up one of said plurality of products.

24. The dispensing system of claim 23, further comprising a product dispenser positioned adjacent to said storage row and in communication with said elevator.

25. The dispensing system of claim 24, wherein said product dispenser comprises a product platter positioned for rotation therein.

26. The dispensing system of claim 25, wherein said product platter comprises a plurality of apertures positioned therein.

27. The dispensing system of claim 26, wherein said plurality of apertures each comprise a product support rotatably positioned therein, said product support sized to allow said elevator arms to pass through said aperture and to support said one of said plurality of products.

28. The dispensing system of claim 27, wherein said product support comprises a hinge attached to said product platter such that said product support will rotate upward when said elevator lifts said one of said plurality of products through said aperture and rotate downward after said one of said plurality of products passes therethrough.

29. The dispensing system of claim 25, wherein said product dispenser comprises a platter motor so as to rotate said product platter.

30. The dispensing system of claim 25, wherein said product dispenser comprises a vending cone positioned on top of the product platter, said vending cone comprising a transparent material.

31. The dispensing system of claim 21, further comprising an outer shell positioned around said storage row and further comprising one or more storage racks positioned on said outer shell.

32. A mobile vending machine for vending a plurality of products, comprising:
a storage compartment for storing said plurality of products;
an electric dispensing mechanism associated with said storage compartment for dispensing said plurality of products to a vending area; and
a drive mechanism;
said storage compartment positioned about said electric drive mechanism for movement therewith.

* * * * *

UNITED STATES PATENT AND TRADEMARK OFFICE
CERTIFICATE OF CORRECTION

PATENT NO. : 6,540,100 B2 Page 1 of 1
DATED : April 1, 2003
INVENTOR(S) : Credle, Jr. et al.

It is certified that error appears in the above-identified patent and that said Letters Patent is hereby corrected as shown below:

<u>Column 18,</u>
Line 51, please delete at the beginning of the paragraph "an electric" and insert
-- a -- before "dispensing".
Line 54, please insert after "a" -- n electric -- before "drive".

Signed and Sealed this

Twenty-seventh Day of January, 2004

JON W. DUDAS
*Acting Director of the United States Patent and Trademark Office*